(No Model.)
T. H. WORRALL & A. LESPERANCE.
CLUTCH.
No. 463,820. Patented Nov. 24, 1891.
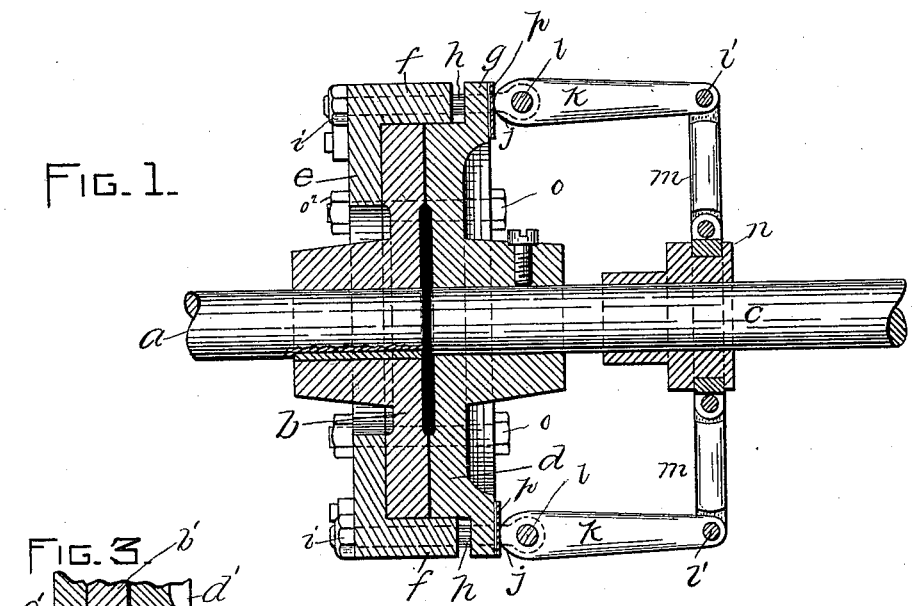
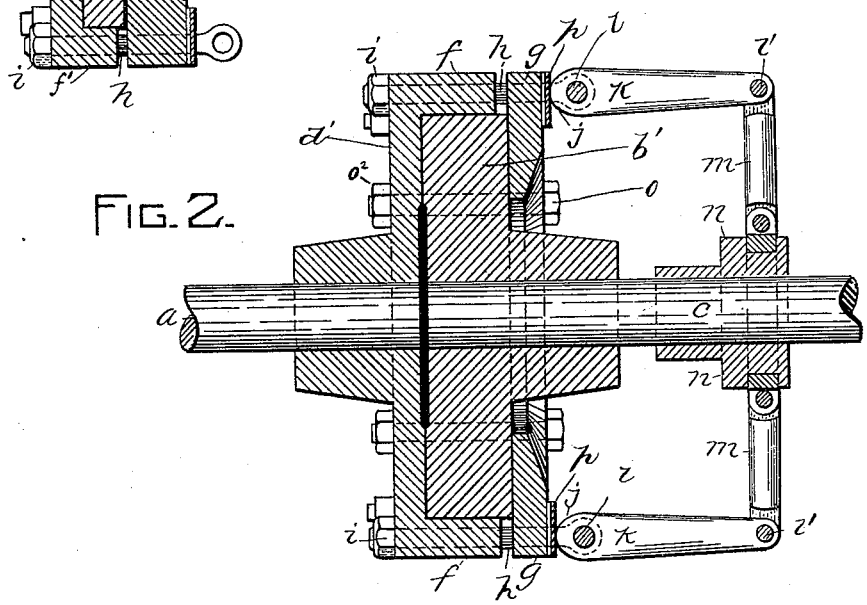
WITNESSES.
INVENTORS.
T. H. Worrall
A. Lesperance
by Wright, Brown & Crossley
Attys.

UNITED STATES PATENT OFFICE.

THOMAS H. WORRALL AND ALEXANDER LESPERANCE, OF LACONIA, NEW HAMPSHIRE; SAID LESPERANCE ASSIGNOR TO SAID WORRALL.

CLUTCH.

SPECIFICATION forming part of Letters Patent No. 463,820, dated November 24, 1891.

Application filed July 9, 1891. Serial No. 398,931. (No model.) Patented in Canada July 10, 1891, No. 57,387.

*To all whom it may concern:*

Be it known that we, THOMAS H. WORRALL and ALEXANDER LESPERANCE, of Laconia, in the county of Belknap and State of New Hampshire, have invented certain new and useful Improvements in Friction-Clutch Mechanisms, (application for a patent for the same improvements having been made in the Dominion of Canada July 10, 1891, No. 57,387,) of which the following is a specification.

The invention has relation to friction-clutch mechanism in general, and is particularly adapted to clutch-couplings in which two shafts or a shaft and a pulley are designed to be connected or coupled and disconnected or uncoupled at will.

It is the object of the invention to provide such improvements in clutch mechanism as will secure and maintain an alignment of the shafts or parts to be connected or coupled.

It is also the object of the invention to provide such improvements in clutch mechanism as will to all intents and purposes relieve the parts of torsional strain or "drag" in the first stage of applying the clutch and permit of a square solid pressure or clamping operation.

It is also the object of the invention to provide improvements whereby a clutch mechanism adapted to be operated at will to couple and uncouple the parts may be rendered rigid in case of necessity.

To these ends the invention consists of a friction-clutch mechanism comprising three members or parts, two of which are constructed as friction-disks, which may be rigidly secured to the shafts or parts to be connected or coupled, and a third formed as a clamping ring or plate independent of the shafts or parts to be connected, one of the said members being provided with a laterally-projecting flange extending over one or it may be over the peripheries of both of the disks to maintain the two disks and their connected parts in alignment, bolts passing through the flange of the flanged member and through the opposite outside member, and clamping means for acting upon the said bolts to clutch and unclutch the parts.

The invention also consists in combining with the foregoing additional bolts which pass through the flange of the flanged member and through the opposite outside member, which bolts are not acted upon by the clamping means, and while allowing of the free action of the members are adapted in case of emergency to assist in rigidly connecting or coupling the parts.

The invention will be more fully described hereinafter, and particularly pointed out in the claims.

Reference is to be had to the annexed drawings, with the letters of reference marked thereon, the same letters of reference designating the same parts or features, as the case may be, wherever they occur.

In the said drawings, Figure 1 is a central sectional view of one form of the improved clutch mechanism. Fig. 2 is a similar view of another form of the invention. Fig. 3 is a sectional detail view showing a slight modification of the form shown in Fig. 1.

In the drawings, *a* designates what may be termed the "driving-shaft," (though it might as well be the sleeve or other part of a loose pulley,) to which is secured a friction-disk *b*, so that it may move in unison therewith.

*c* designates what may be termed the "driven shaft," to which is keyed or otherwise secured a friction-disk *d*.

*e* is a clamping ring or plate, which is constructed and arranged to bear upon the side of one or the other of the disks or members *b d* and to move independent of the disk against which it bears, as also independent of the shaft or part to which the latter disk is secured. As is represented in Fig. 1, the ring *e* is provided with a laterally-projecting flange *f*, which extends over the periphery of the disk *b* and upon the periphery of the disk *d*, the latter being provided with a radially-projecting flange *g*.

*h* designates bolts, each provided upon one end with an adjusting-nut *i* and headed on the opposite ends, the said bolts passing through the flange *f* of the ring *e* and through the outer portion or flange *g* of the disk *d*.

*j* designates the inner ends of the levers *k*, which are constructed as cams, which cams are adapted to act upon plates *p*, or it may be directly on the face of the disk *d* to draw upon the bolts *h* and frictionally couple or connect the disks *b d*. The cam-levers *k* are fulcrumed at their inner ends upon pins $l$, connected with the heads of the bolts $h$, and are pivoted at their opposite ends, as at $l'$, to the outer ends of levers $m$, which latter devices are suitably connected at their inner ends with a sliding collar $n$ on the shaft $c$. Other suitable or known means may, however, be employed for operating upon the bolts $h$ for clutching or coupling or disconnecting or uncoupling the parts.

$o$ designates bolts headed upon one end and provided with adjusting-nuts $o^2$ on their opposite ends, with which bolts no clamping or clutching devices are connected, but which, like the bolts $h$, pass through the flange $f$ of the ring or plate and through the outer portion of the opposite outside disk $d$. The nuts on the bolts $o$ will be so adjusted as to allow the friction-disks to be separated and brought together by the clamping means for the purpose of uncoupling or disconnecting and coupling or connecting the parts. With this construction and arrangement of the members constituting the improved clutch mechanism it will be seen that the shafts and disks are maintained in perfect alignment, both when in coupled or uncoupled positions, and that the draft on the bolts and ring will be in a line exactly parallel with both shafts, which is a most important feature of the invention.

There is great liability in the use of clutch-couplings on divided shafts and similar means of the part to which one friction-disk is secured, or it may be both parts, to sag and get out of alignment, so that when the coupling or clutching operation is performed there will be damaging torsional strain exerted on the parts, and, besides, the disks will not be brought squarely or firmly together.

Another important advantage gained by the improvement is that there is but a very short length of unsupported bolt between the flange of the ring and the outside disk or member $d$, through which the said bolts also pass, so that there cannot be any appreciable independent axial movement between the ring and disk $d$, due to torsional strain on the bolts $h$, which would not be the case if there were no flanged member and the bolts extended unsupported across the disk or inner member $b$. The headed bolts $o$, as also the bolts $h$, may be employed to rigidly couple the shafts or other parts in case of emergency by turning up the nuts thereon quite firmly.

In Fig. 2 the disk or member $d'$ is shown as provided with a flange extending over the periphery of the disk or member $b'$, and the ring $l'$ is constructed without a flange and is arranged to bear against the outer face of the latter disk.

In Fig. 3 the disk $d'$ is shown as constructed without a flange, the periphery of said disk extending out coincident with the periphery of the flange $f'$ of the ring $e'$, and said flange $f'$ stopping short of the disk $d'$, so that it extends only over the periphery of the disk $b'$. The levers $k\ m$ and their adjuncts may be arranged to operate on the left side of the clutching devices as well as upon the right, as is shown. These and other formal changes may be made in the construction and arrangement of the parts without departing from the nature and spirit of the invention.

In another application for a patent filed by one of the present applicants February 16, 1891, Serial No. 381,674, an improvement upon the invention herein shown and explained is described and claimed, which improvement consists in providing one of the members with a beveled surface and an adjacent member with a co-operating inclined surface, in order to effect a perfect centering of the members and shaft. We, however, disclaim this improvement as of our joint invention.

We claim as our invention—

1. A friction-clutch mechanism comprising three members, two of which are constructed as friction-disks secured to their supports and a third formed as a clamping ring or plate independent of the said supports, one of said members being provided with a laterally-projecting flange extending over or upon the periphery of the adjacent member, bolts passing through the said laterally-projecting flange of the flanged member and through the opposite outside member, and clamping devices for acting upon said bolts, as set forth.

2. A friction-clutch mechanism comprising three members, two of which are constructed as friction-disks secured to their supports and a third formed as a clamping ring or plate independent of the said supports, one of said members being provided with a laterally-projecting flange extending over or upon the periphery of the adjacent member, bolts $h$, passing through the said laterally-projecting flange of the flanged member and through the opposite outside member, clamping devices for acting upon the said bolts $h$, and headed bolts $o$, also passing through the said laterally-projecting flange of the flanged member and the outside member, the said bolts $o$ being provided with clamping or adjusting nuts, as set forth.

In testimony whereof we have signed our names to this specification, in the presence of two subscribing witnesses, this 3d day of July, A. D. 1891.

THOMAS H. WORRALL.
ALEXANDER LESPERANCE.

Witnesses:
JOHN W. ASHMAN,
EDGAR F. REEVES.